United States Patent [19]

Van Dort et al.

[11] Patent Number: 5,084,292
[45] Date of Patent: Jan. 28, 1992

[54] PROCESS FOR PREPARING FLAVOURINGS AND PERFUMES BASED ON ONE OR MORE CAROTENOIDS AS STARTING MATERIAL

[75] Inventors: Johannes M. Van Dort, Lage Vuursche; Johannes T. De Heij, Hilversum; Harry Renes, Blaricum, all of Netherlands

[73] Assignee: Unilever Patent Holdings B.V., Rotterdam, Netherlands

[21] Appl. No.: 528,211

[22] Filed: May 25, 1990

[30] Foreign Application Priority Data

May 25, 1989 [NL] Netherlands ............... 8901317

[51] Int. Cl.$^5$ ............................. A23L 1/226
[52] U.S. Cl. ............................. 426/533; 512/1; 512/5; 512/8
[58] Field of Search ............... 426/533; 512/1, 5, 8

[56] References Cited

U.S. PATENT DOCUMENTS 2,959,521 11/1960 Zajic .
3,988,432 10/1976 Steltenkamp .
4,351,346 9/1982 Brummer et al. ............. 426/248 X

FOREIGN PATENT DOCUMENTS 1131573 2/1957 France .

OTHER PUBLICATIONS

Journal of Agricultural & Food Chemistry, vol. 18, No. 1, Jan–Feb 1970-E. G. Laroe et al.: "Whiskey Composition: Formation of Alpha-And Beta-Ionone by the Thermal Decomposition Obbeta-Carotene", Bladzijde 174-175, Zie Tabel I; p. 174, col. 1, Line 3.
Journal of Agriculture & Food Chemistry, vol. 30, No. 6, 1982, American Chemical Society, P. N. Onyewu et al., "Formation of Two Thermal Degradation products of Beta-Carotene", pp. 1147-1151, Table 1.
Chemical Abstracts, vol. 92, 1980 (Columbus, Ohio, U.S.) P. Schreier et al.
Chemical Abstracts, vol. 98, 1983, (Columbus, Ohio, U.S.) M. Kawakami.
Chemical Abstracts, vol. 75, 1971, (Columbus, Ohio, U.S.) E. V. Alekseev et al.
Beiogeneration of Aromas, T. H. Parliment et al., American Chemical Society, 1986, Washington, D.C., U.S.) W. W. Weeks.

Primary Examiner—Joseph Golian
Attorney, Agent, or Firm—Cushman, Darby & Cushman

[57] ABSTRACT

The invention provides a process for preparing flavouring and perfume complexes by converting one or more carotenoids like carotenes, xanthophylls etc. into a reaction product with organoleptic properties in the presence of a liquid solvent or liquid suspension medium containing an oxygen-containing gas at a temperature in the 20°–250° C. range under a pressure of not more than 400 bar. The obtained products—optionally after a complete or partial removal of the solvent or suspension medium—may be used for the direct or indirect perfuming and flavouring respectively of materials.

13 Claims, No Drawings

PROCESS FOR PREPARING FLAVOURINGS AND PERFUMES BASED ON ONE OR MORE CAROTENOIDS AS STARTING MATERIAL

The invention relates to a process for preparing flavourings and perfumes, in particular flavouring and perfume complexes, based on one or more carotenoids as starting material.

In J. Agric. Food Chem., 1982, 30, No. 6, pages 1147–1151, in particular in Table I, a summary is given of, inter alia, the research results relating to the oxidative degradation of $\beta$-carotene in particular. For example, a test carried out by LaRoe and Shipley (J. Agric. Food Chem. 1970, 18, page 174) relates to heating $\beta$-carotene in water at 100° C. for 30 minutes, which resulted in a reaction mixture in which $\alpha$-ionone and $\beta$-ionone were detected. A second test carried out by LaRoe and Shipley (loc. cit.) relates to heating $\beta$-carotene in benzene as a solvent at 188° C. for 72 hours in the presence of air. In this lastmentioned test, a reaction mixture was obtained in which $\alpha$-ionone, $\beta$-ionone, toluene, m-xylene and dimethylnaphthalene were identified.

The table cited above furthermore refers to the experiments carried out by Schreir et al. (Chem. Mikrobiol. Technol. Lebensm., 1979, 6, No. 3, pages 90–91; Chem. Abstr. 92, (1980), 74636h) in which $\beta$-carotene was degraded for 10 minutes at 190° C. and 220° C. in the presence of nitrogen or air. Various types of volatile compounds were obtained depending on the reaction conditions. Under a nitrogen atmosphere, toluene, m-xylene and ionene were mainly formed, and in the presence of air, $\beta$-ionone, dihydroactinidiolide and 5,6-epoxy-$\beta$-ionone were mainly obtained.

In relation to the research results discussed above or the other research results reported in J. Agric. Food Chem., 1982, 30, No. 6, pages 1147–1151, it may be stated that many types of compounds are obtained in the oxidative degradation of $\beta$-carotene, depending on the reaction conditions. The organoleptic value of some of the compounds thereof is known per se, but not of others; some compounds such as toluene and m-xylene must, however, be regarded even as undesirable from an organoleptic point of view. No indication or suggestion of the possible preparation on an industrial scale of flavouring or perfume complexes based on $\beta$-carotene or other carotenoids can therefore in any way be derived from this literature reference.

In Nippon Nogei Kugaka Kaishi, 1982, 56, No. 10, pages 917–921 (see Chem. Abstr. 98, (1983) 52201j), pure $\beta$-carotene, inter alia, is degraded at a temperature of 90° C., 120° C. and 150° C. More particularly, 500 mg of $\beta$-carotene as a suspension in 2 liters of water is converted with the aid of a rotary evaporator at a bath temperature of 90° C., 120° C. and 150° C. respectively under reduced pressure to a dry product and simultaneously decomposed. The water distillates obtained at each of these temperatures were extracted with ether, after which the extracts were investigated with the aid of gas chromatography. Of the more than 40 compounds found, dihydroactinidiolide always proved to be the most important compound from a quantitative point of view at all the three temperatures tested. In addition to dihydroactinidiolide, 2,6,6-trimethyl-2-hydroxycyclohexanone, $\beta$-cyclocitral, 2,6,6-trimethyl-2-hydroxycyclohexane-1-aldehyde, $\beta$-ionone, 5,6-epoxy-$\beta$-ionone and 2,6,6-trimethyl-2,3-epoxycyclohexylidene-1-acetaldehyde, which are all provided with their own flavouring characteristic, are mentioned in Table II of this literature reference as principal products.

In summary, it may be stated in relation to the last mentioned literature reference that, despite the reporting of many features relating to the process and properties of the degradation products obtained from, in particular, $\beta$-carotene, no indication or suggestion at all is given therein of the preparation of flavourings and/or perfumes based on $\beta$-carotene as a starting material which could in fact also be used on an industrial scale.

The autoxidation of $\beta$-carotene in solution is furthermore known from Chem. Abstr. 75, (1971), 4293u due to E. V. Alekseev. In this case, synthetic $\beta$-carotene having a melting point of 173°–175° C. is dissolved in benzene and then pure oxgen is passed through at 50° C. As regards the reaction, it is only reported that the rate of oxidation of $\beta$-carotene did not change during the oxidation and the role of the peroxides thereupon produced was fairly small. Once again, this literature reference gives no indication of a possible applicability of the products obtained as a flavouring and perfume.

In relation to the literature cited above it is emphasized that it solely describes the investigation of the degradation of a few carotenoids by analytical chemistry, to be specific, $\beta$-carotene in particular. In this investigation, very dilute solutions or suspensions are generally used and complicated mixtures of compounds are often obtained. Although the organoleptic properties of some of the compounds obtained are known, the processes described are not in the least suitable for preparing these compounds on a preparative scale. It is still less possible to deduce from this literature that oxidative degradation of carotenoids on an industrial scale makes it possible to prepare a complete flavouring or perfume complex which can be used without further separation or purification. In this connection reference is made to the fact that it has been known for decades that $\beta$-carotene is the precursor of ionones (see, for example, the first-mentioned literature reference, which refers to data originating from 1970) but that, despite the need for optimum flavourings and perfume, little or no attention has been paid to this.

Surprisingly, the Applicant has now found a process in which flavouring and perfume complexes which are suitable, inter alia, for flavouring many foodstuffs or for perfuming products can be prepared on an industrial scale on the basis of carotenoids.

The invention therefore relates to a process for preparing flavouring and perfume complexes based on one or more carotenoids as starting material which is characterized in that one or more carotenoids is/are converted into a reaction product with organoleptic properties in the presence of a liquid solvent or suspension medium containing an oxygen-containing gas at a temperature in the 20°–250° C. range under a pressure of not more than 400 atm and the solvent or suspension medium is then, if desired, completely or partially removed from the reaction product obtained.

To prepare flavouring and perfume complexes on an industrial scale, it is advisable to start from fairly concentrated carotenoid solutions or suspensions. In general, a concentration of not less than 1 g, preferably not less than 5 g, for example 25–100 g, of carotenoid per liter of solvent or suspension medium is/are used. The organoleptic nature of the product obtained can be steered as desired in diverse required directions by varying the amount of oxygen or pressure and temperature used, with the result that diverse various flavouring or perfume complexes can be prepared with the process according to the invention, starting from a particular carotenoid. Consequently, by also varying the starting material, a large number of different flavouring and perfume complexes can be obtained.

According to Römpps Chemie-Lexikon, 7th edition (published by Franckh'sche Verlagshandlung Stuttgart), page 512, the carotenoids which can be used as starting material in the process according to the invention can be divided into four groups, viz. (a) the hydrocarbons (the carotenes such as α- and β-carotene), (b) the ketone and hydroxyl derivatives (the xanthophylls such as lutein), (c) the carotenic acids and (d) the xanthophyl esters such as the dipalmitate esters.

An important advantage of the process according to the invention is that the xanthophyl esters can be used directly as starting material, with the result that a time-consuming saponification and purification of the saponified product is superfluous. In particular, the fatty acids do not yield in the present oxidation any fatty notes such as, for example, that of the compound nonenol, which has the smell of putty. A further clarification of carotenoids of natural origin is given in Straub O., "List of Natural Carotenoids" in Carotenoids 1971.

Since the process according to the invention is advantageously carried out on an industrial scale, synthetic β-carotene, which is available on a large scale, lutein or an extract of the algae species *Dunaliella bardawil*, carrots, tagetes and annatto seeds are preferred as starting material. Other starting materials are concentrated or unconcentrated extracts of carotenoid-containing vegetable materials which, if used as starting material for flavouring complexes, must be acceptable for human consumption. Examples of such materials are, in particular, edible plant parts or fruits such as green tea, paprikas and tomatoes. Other less obvious examples in this connection are leaves of all edible green plants such as even vine leaves, which are in principle considered acceptable for human consumption. In addition to vegetable materials, carotenoid-containing microorganisms and algae, such as the abovementioned species *Dunaliella bardawil*, may be extracted. In this connection, attention is paid to microorganisms which occur on fruits. Reference is made more particularly to the U.S. Pat. No. 2,959,521, which describes the microbial production of β-carotene by *Choanephora trispora*.

One of the essential aspects of the process according to the invention is that the reaction is carried out under conditions in which the solvent or suspension medium used is in the liquid phase. The pressure must therefore always be higher than the partial vapour pressure of the solvent or suspension medium used and for ethanol, for example, is 2 to 3 bar at 125° C. Advantageously, the reaction is carried out under a pressure of 5–100 bar.

In view of the increased pressure used in the process according to the invention, the process concerned can be carried out in autoclaves. Such autoclaves are generally known and are used, for example, for the hydrogenation (hardening) of fats for the preparation of margarine.

"Food-grade" solvents are preferably used as solvents or suspension media because flavouring compositions must also be prepared with these solvents. Examples of such solvents are water and alkanols containing 1–3 carbon atoms such as, in particular, ethanol and, to a lesser extent, methanol as well as glycerol and propylene glycol. Furthermore, under standard conditions liquid alkanes such as pentane and hexane, paraffins and cycloalkanes containing 6–10 carbon atoms such as cyclohexane may be mentioned.

In principle, any type of gas mixture, including pure oxygen, is suitable as oxygen-containing gas. Preferably, however, air is used since this is considered as above suspicion in the foodstuffs sector. In general, an excess of oxygen-containing gas which corresponds to not less than 5 mol, preferably not less than 20 mol and advantageously not less than 35 mol of oxygen per mol of starting carotenoid is used. In the process according to the invention, it is possible to feed the amount of oxygen required for the conversion in batches to the reactor such as, for instance, an autoclave. Normally, in the process according to the invention, it is not a homogeneous solution which is used, but a suspension of the starting carotenoid. For example, β-carotene is insoluble or virtually insoluble in ethanol, while the end product is in fact soluble. This phenomenon therefore characterizes the end point of the conversion or indicates the required amount of oxygen. The process according to the invention can advantageously also be carried out continuously.

The temperature to be used in the process according to the invention is in the 20°–250° C. range. More particularly, the lower limit of said temperature range is determined by the reaction rate still occurring, while the upper limit thereof is dominated by, inter alia, safety aspects such as the flash point of the solvent or suspension medium used. Preferably, the conversion is carried out in a temperature range of 60°–180° C.

As stated, one of the striking aspects of the invention resides in the fact that, starting from the same starting material, there is evidently a relationship between, on the one hand, the temperature or pressure and, on the other hand, the end product flavour or odour obtained. More particularly, the oxidation of β-carotene in ethanol (as suspension) yields an end product (as a solution in ethanol) with a fruity aroma at a temperature of 80° C., while the same oxidation process yields an end product (as a solution in ethanol) with a woody and tobacco character at a temperature of 150° C.

An important aspect of the process according to the invention is furthermore that it can be carried out reproducibly on a g scale or even on a kg scale and therefore on an industrial scale. Only in this manner is it possible to obtain sufficient flavourings and perfumes to, inter alia, flavour large amounts of foodstuffs.

The time period which is necessary to carry out the process according to the invention may vary from a few hours to a few days and depends primarily on the temperature and pressure used and the required flavour or the intended odour of the end product. In this connection it is pointed out, perhaps unnecessarily, that the present process is in principle an oxidation process, the process control of which is purely sensory, i.e. the process control is established on the basis of the desired organoleptic requirements.

Finally, it is possible to subject the crude reaction product, as obtained in the process according to the invention, to a fractionation treatment, for example a chromatographic or distillative method. In this manner products are obtained which usually have an "inherent" specific nature.

If used as an odoriferous or perfume ingredient, the product obtained in the process according to the invention can be used either as such, as an odour-imparting agent, or as a component in all kinds of perfume compositions.

The term "perfume composition" is here understood to mean a mixture of fragrances and optionally auxiliary substances, if desired dissolved in a suitable solvent or mixed with a powdered substrate and used to impart a desired odour to the skin and/or all kinds of products. Examples of such products are: soaps, detergents, air fresheners, room sprays, pomanders, candles, cosmetics such as creams, ointments, toilet waters, pre-and after-shave lotions, talcum powders, hair-care agents, body deodorants and antiperspirants.

Frangrances and mixtures thereof which can be used in combination with the product according to the invention to prepare perfume compositions are, for example, natural products such as essential oils, absolutes, resinoids, resins, concretes etc., but also synthetic fragrances such as hydrocarbons, alcohols, aldehydes, ketones, ethers, acids, esters, acetals, ketals, nitriles etc., including saturated and unsaturated compounds, aliphatic, carbocyclic and heterocyclic compounds. Examples of fragrances which can be used in combination with the products according to the invention are: geraniol, geranyl acetate, linalool, linalyl acetate, tetrahydro linalool, citronellol, citronellyl acetate, dihydro mycenol, dihydro myrcenyl acetate, tetrahydro myrcenol, terpineol, terpinyl acetate, nopol, nopyl acetate, 2-phenylethanol, 2-phenylethyl acetate, benzyl alcohol, benzyl acetate, benzyl salicylate, styrallyl acetate, benzyl benzoate, amyl salicylate, dimethylbenzyl carbinol, trichloromethylphenylcarbinly acetate, p-tert-butylcyclohexyl acetate, isononyl acetate, vetiveryl acetate, vetiverol, $\alpha$-hexylcinnamaldehyde, 2-methyl-3-(p-tert-butylphenyl)propanal, 2-methyl-3-(p-isopropylphenyl)-propanal, 3-(p-tert-butylphenyl)propanal, tricyclodecenyl acetate, tricyclodecenyl propionate, 4-(4-hydroxy-4-methylpentyl)-3-cyclohexene carbaldehyde, 4-(4-methyl-3-pentenyl)-3-cyclohexene carbaldehyde, 4-acetoxy-3-pentyltetrahydropyran, 3-carboxymethyl-2-pentylcyclopentane, 2-n-heptylcyclopentanone, 3-methyl-2-pentyl-2-cyclopentanone, n-decanal, n-dodecanal, dec-9-en-1-ol, phenoxyethyl isobutyrate, phenylacetaldehyde dimethylacetal, phenylacetaldehyde diethylacetal, geranyl nitrile, citronellyl nitrile, cedryl acetate, 3-isocamphylcyclohexanol, cedryl methyl ether, isolongifolanone, aubepine nitrile, aubepine, heliotropin, coumarin, eugenol, vanillin, diphenyl oxide, hydroxy citronellal, ionones, methylionones, isomethylionones, irones, cis-3-hexenol and esters thereof, indan musk perfumes, tetralin musk perfumes, isochroman musk perfumes, macrocyclic ketones, macrolactone musk perfumes, ethylene brassylate, aromatic nitromusk fragrances.

Auxiliary substances and solvents which can be used in perfume compositions which contain a product according to the invention are, for example, ethanol, isopropanol, diethyleneglycol monoethyl ether, diethylphthalate etc.

The amounts in which the product according to the invention can be used in perfume compositions or materials to be perfumed can be varied within wide limits and depend, inter alia, on the nature of the material in which the perfume is used, on the nature and the amounts of the other components in the perfume compositions and on the odour effect which is intended. It is therefore only possible to indicate rough limits, which, however, provide sufficient information for a person skilled in the art to be able to use the products according to the invention independently. In most cases, an amount of only 0.001% by weight in a perfume composition will already be sufficient to obtain a clearly perceptible odour effect. On the other hand, it is possible to use an amount of 30% by weight or even more in a composition for obtaining special odour effects. In materials perfumed with the aid of perfume compositions, these concentrations are proportionately lower, depending on the amount of the composition used in the material.

Furthermore, the products according to the invention may be added as such to food and allied products or may first be mixed with carriers or solvents common in the flavouring industry. Preferably, however, they are included in flavouring compositions. In this connection, the term "flavouring composition" is understood to mean a mixture of flavouring components of natural and/or synthetic origin, if required dissolved in a suitable solvent or mixed with a powdered substrate, or processed to form a powdered product, which is used to impart a desired taste to all kinds of foods and allied products. The term "food and allied products" is understood to mean: solid or liquid products intended for human consumption, including tobacco products, medicines and toothpastes.

Flavouring components of natural or synthetic origin which can be combined in flavouring compositions with the products according to the invention are, for example, mentioned in S. Arctander, Perfume and Flavor Chemicals (Montclair, N.J., 1969), in S. Arctander, Perfume and Flavor Materials of Natural Origin (Elisabeth, N.J., 1960), in T. E. Furia et al., CRC Fenaroli's Handbook of Flavor Ingredients, 2nd Edition (Cleveland, CRC Press Inc., 1975) and in H. B. Heath, Source Book of Flavors (The AVI Publishing Company Inc., Westport, Conn., 1981).

The amounts in which the compounds according to the invention can be used in flavouring compositions or products to be flavoured can be varied within wide limits and depend, inter alia, on the nature of the product in which the compounds are used, on the nature and the amount of the other flavouring components in the flavouring composition and on the flavouring effect which is intended. It is therefore only possible to indicate rough limits, but this provides sufficient information for a person skilled in the art to be able to use the products according to the invention independently. For example, the products according to the invention may be included in the food or allied products to be flavoured in an amount of 0.01–100 ppm.

The following examples serve solely to illustrate the preparation and use of the compounds according to the invention. The invention is, however, not limited thereto.

EXAMPLE I 100 ml of methanol and 5 g of synthetic $\beta$-carotene were introduced into an autoclave having a capacity of 0.5 l. The autoclave was then shaken at 150° C. under an air pressure of approximately 10 bar. During shaking, the air in the autoclave was refreshed often enough for the contents thereof to become homogeneous. The reaction time was approximately 4 hours. The product obtained had an aromatic, woody and sweet character.

EXAMPLE II 100 ml of ethanol (96% strength) and 5 g of synthetic $\beta$-carotene were introduced into an autoclave having a capacity of 0.5 l. After heating to 80° C., the air pressure was adjusted to approximately 100 bar, after which the autoclave was shaken for 7 hours. A light-coloured homogeneous end product with a fresh, iononic and sweet character was obtained.

EXAMPLE III 100 mg of ascorbic acid were added to the product prepared according to Example II, after which the ethanol was distilled off under vacuum. The residue was then subjected to a high-vacuum distillation in which approximately 2.5 g of a colourless oily distillate with $bp_1 \leq 80°$ C. was obtained. The product obtained had a very fresh, iononically "pure" and sweet character.

EXAMPLE IV 100 ml of ethanol (96% strength) and 5 g of carrot extract containing 10% of a mixture of $\alpha$- and $\beta$-carotene isomers, were introduced into an autoclave having a capacity of 0.5 l. The autoclave was then shaken for 5 hours under an air pressure of 15 bar at 125° C. After the autoclave was opened, the contents thereof were filtered. A clear, light-coloured product having a fresh, iononic and raspberry-like character was obtained.

EXAMPLE V 200 ml of propanol and 10 g of purified lutein were introduced into an autoclave having a capacity of 0.5 l. The autoclave was then shaken for 20 hours under an air pressure of 5 bar at 135° C. The homogeneous product obtained had a strong sweet, iononic, woody and dusty character.

EXAMPLE VI 2 liters of ethanol (96% strength) and 115 g of xanthophyll obtained from tagetes were introduced into an autoclave having a capacity of 3 liters. The autoclave contents were stirred for approximately 6 hours at 120° C. under an air pressure of 80 bar, the air in the autoclave being refreshed 12 times and the composition of the reaction product being constant. After carrying out a filtration to remove the waxy constituents, the clear filtrate was concentrated using a rotary evaporator. The product had a strong general tobacco character.

EXAMPLE VII 200 ml of ethanol (96% strength) and 5 g of canthaxantin were introduced into an autoclave having a capacity of 0.5 l. After a reaction time of 7.5 hours at 150° C. and under an air pressure of 6 bar, a product having a strong dry, woody and cognac-like flavour was obtained.

EXAMPLE VIII 30 liters of ethanol (96% strength) and 0.5 kg of $\beta$-carotene were introduced into an autoclave having a capacity of 50 l. After heating to 120° C., the air pressure in the autoclave was adjusted to 15 bar. The air above the said suspension was now refreshed often enough for a homogeneous reaction product to be obtained. After concentrating, a product having a strong general tobacco character was obtained.

EXAMPLE IX 200 ml of ethanol (96% strength) and 0.2 g of annatto extract were introduced into an autoclave having a capacity of 0.5 l. After shaking the autoclave for 42 hours at 110° C. and under an air pressure of 90 bar, a product having a delicate fresh, spicy and citrus character was obtained.

EXAMPLE X

A mixture of 100 ml of paraffin and 0.5 g of synthetic $\beta$-carotene was heated at 150° C. for 2 hours in an autoclave having a capacity of 250 ml. After cooling and venting, heating was again carried out for 2 hours at 150° C. The coloured product obtained has a metallic, iononic and flowery character.

EXAMPLE XI

A mixture of 100 ml of hexane and 5 g of synthetic $\beta$-carotene was heated at 80° C. for 1 hour in an autoclave having a capacity of 250 ml. After cooling to room temperature and venting, heating was again carried out at 80° C. for 1 hour. This cycle was repeated until a homogeneous, light-coloured solution was produced. The product obtained in this manner has an aromatic, sweet, flowery and woody character.

EXAMPLE XII

Tea Flavouring

|  | parts by weight |
| --- | --- |
| Tea extract | 700 |
| Ethanol | 256 |
| Chirette tincture | 12 |
| Bergamot oil | 5 |
| Hay abs. sol* | 5 |
| Acetic acid sol.* | 5 |
| Mate abs. sol.* | 4 |
| Davana oil sol.* | 4 |
| Sauge sclaree sol.* | 4 |
| Mixture according to Example VI** | 5 |
| Total | 1000 |

*as 1% (w/v) solution in ethanol
**as 5% (w/v) solution in ethanol

EXAMPLE XIII

Raspberry Flavouring Mixture

|  | parts by weight |
| --- | --- |
| Benzyl acetate | 500 |
| Amyl acetate | 250 |
| Benzyl alcohol | 182 |
| Geraniol | 5 |
| Citronellol | 4 |
| Ethyl valerianate | 2 |
| Isobutyl acetate | 2 |
| $\gamma$-undecalactone | 2 |
| Vanillin | 2 |
| Phenylethyl alcohol | 1 |
| Mixture according to Example IV* | 50 |
| Total | 1000 |

*as 5% (w/v) solution in ethanol.

EXAMPLE XIV

Shampoo Perfume

|  | parts by weight |
| --- | --- |
| Bergamot oil | 150 |
| $\alpha$-amylcinnamaldehyde | 100 |
| Muguet base | 100 |
| Benzyl acetate | 70 |
| Traseolide | 50 |
| Methyl dihydrojasmonate | 50 |
| Lemon oil | 40 |

-continued

| | parts by weight |
|---|---|
| Benzyl salicylate | 35 |
| Rose oil Bulgarian | 30 |
| Undecanal* | 20 |
| Coumarin | 15 |
| Benzoë resinoid Siam | 15 |
| Isoeugenyl acetate | 15 |
| 11-Oxahexadecanolide | 10 |
| 2-Methylundecanal* | 10 |
| Dodecanal* | 10 |
| Costus oil | 10 |
| Mousse de chêne absolue | 5 |
| Methyleugenol | 5 |
| Iris oil | 5 |
| γ-undecalactone* | 5 |
| Mixture according to Example III** | 50 |
| Total | 800 |

*as 10% (w/v) solution in dipropylene glycol
**as 5% (w/v) solution in ethanol

EXAMPLE XV

Virginia Flavouring

| | parts by weight |
|---|---|
| Benzyl alcohol | 263 |
| γ-butyrolactone | 250 |
| Ethyl palmitate | 200 |
| Acetic acid | 60 |
| γ-valerolactone | 60 |
| Farnesol | 25 |
| Valeric acid | 20 |
| γ-heptalactone | 20 |
| Ethyllaurate | 20 |
| Ethyl decanoate | 10 |
| Malt extract (20% dry substance) | 10 |
| Coffee extract | 10 |
| Furfural | 10 |
| Guajacol | 5 |
| Benzaldehyde | 4 |
| Acetophenone | 4 |
| Methylheptenone | 4 |
| Mixture according to Example VI* | |
| Total | 1000 |

*as 5% (w/v) solution in ethanol

EXAMPLE XVI

Paella Flavouring Mixture

| | parts by weight |
|---|---|
| Salt: NaCl | 288 |
| Paprika powder | 300 |
| Garlic powder | 250 |
| Pepper | 100 |
| Capsicum | 10 |
| Bay leaf | 1 |
| Thyme | 1 |
| Mixture according to Example VII* | 50 |
| Total | 1000 |

*as 5% (w/v) solution in ethanol (obtained by further concentration as a result of evaporating down)

EXAMPLE XVII

Rose Perfume

| | parts by weight |
|---|---|
| Phenylethyl alcohol | 465 |
| Geraniol | 100 |
| Citronellol | 100 |
| Rose absolue** | 50 |

| | parts by weight |
|---|---|
| Phenylethyl acetate | 40 |
| Trichloromethylphenylcarbinyl acetate | 30 |
| Geranium oil | 30 |
| Undecen-10-al* | 25 |
| Clove oil | 20 |
| Phenylacetaldehyde dimethylacetal | 20 |
| Hydroxycitronellal | 20 |
| Undec-10-en-1-ol* | 20 |
| Ylang oil | 10 |
| Benzyl acetate | 10 |
| Citronellyl acetate | 10 |
| Cinnamyl alcohol | 10 |
| 1-Nonanol* | 10 |
| Methylphenyl acetate | 5 |
| Isobutyl salicylate | 5 |
| Musk tincture | 5 |
| Mixture according to Example IV*** | 15 |
| Total | 1000 |

*as 10% (w/v) solution in dipropylene glycol
**as 10% (w/v) solution in ethanol
***as 5% (w/v) solution in ethanol

EXAMPLE XVIII

Tomato Flavouring Mixture

| | parts by weight |
|---|---|
| 2-ethylhexanol | 200 |
| Dimethyl sulfide* | 130 |
| Amyl valerianate | 130 |
| Cis-3-hexenol | 120 |
| 3-Methylbutanal | 100 |
| Amyl butyrate | 50 |
| Isobutanol | 50 |
| Butyl hexanoate | 50 |
| Hexanal | 50 |
| Methyl salicylate | 20 |
| Hexyl acetate | 15 |
| Amyl acetate | 15 |
| Benzaldehyde | 15 |
| Linalool oxide | 15 |
| Geranylacetone | 3 |
| Hexen-2-al | 3 |
| Cinnamaldehyde | 2 |
| Citronellal | 2 |
| Methional | 2 |
| 2-Isobutylthiazole | 2 |
| 2-Acetylthiazole | 1 |
| Mixture according to Example IX** | 25 |
| Total | 1000 |

*as 1% (w/v) solution in ethanol
**as 5% (w/v) solution in ethanol (obtained after concentration)

EXAMPLE XIX

Pipe Tobacco Flavouring Mixture

| | parts by weight |
|---|---|
| Propylene glycol | 536 |
| Apricot oleoresin | 350 |
| Vanillin | 80 |
| Ylang oil | 5 |
| Maltol | 2 |
| Coriander oil | 2 |
| Mixture according to Example V** | 25 |
| Total | 1000 |

*as 1% (w/v) solution in ethanol
**as 5% (w/v) solution in ethanol (obtained after concentration)

On replacing the mixture according to Example V by an equal amount of the mixture according to Example VIII, a pipe flavouring mixture with excellent properties was likewise obtained.

EXAMPLE XX

White Wine Flavouring Mixture

|  | parts by weight |
| --- | --- |
| Coriander oil | 355 |
| Davana oil | 200 |
| Sauge sclaree oil | 200 |
| Methyl-N-methylanthranilate | 100 |
| Geranium oil bourbon | 100 |
| Sureau pays abs. | 40 |
| Mixture according to Example III* | 5 |
| Total | 1000 |

*as 5% (w/v) solution in ethanol

We claim:

1. Process for preparing flavouring and perfume complexes based on one or more carotenoids as starting material, comprising auto-oxidizing one or more carotenoids into a reaction product with organoleptic properties in the presence of a liquid solvent or suspension medium containing an oxygen-containing gas comprising an amount of $\geq 5$ mol $O_2$ per mol carotenoid at a temperature in the 20°-250° C. range and under a pressure of 2 to 400 bar, the temperature and pressure being such that the solvent or suspension medium is maintained in the liquid phase.

2. Process according to claim 1, comprising by using one or more carotenes, xanthophylls and/or esters derived therefrom or an extract of the algae species *Dunaliella bardawil*, an extract of carrots or an extract of annatto seeds as starting material.

3. Process according to claim 2, wherein synthetic $\beta$-carotene, lutein, a tagetes extract or a hexane extract of carrots is used as starting material.

4. Process according to claim 1, wherein not less than 5 g of carotenoid per liter of solvent or suspension medium is used as starting product.

5. Process according to claim 1, wherein the preparation is carried out under a pressure of 5-100 bar.

6. Process according to claim 1, wherein water, an alkanol containing 1-3 carbon atoms, an alkane containing 5-10 carbon atoms, a cycloalkane containing 6-10 carbon atoms or paraffin is used as solvent or suspension medium.

7. Process according to claim 6, wherein water and/or an alkanol containing 1-3 carbon atoms is used as solvent or suspension medium.

8. Process according to claim 7, wherein ethanol is used as solvent or suspension medium.

9. Process according to claim 1, wherein air is used as oxygen-containing gas.

10. Process according to claim 1, wherein an amount of oxygen-containing gas is used which corresponds to not less than 20 mol of oxygen per mol of carotenoid used as starting material.

11. Process according to claim 1, wherein the conversion is carried out at a temperature in the 60°-180° C. range.

12. Process according to claim 1, wherein the end product obtained in the process according to claim 1 is subjected to a fractionation treatment.

13. Process according to claim 1 wherein the reaction product as obtained is used directly in a perfume or flavoring composition.

* * * * *